United States Patent [19]

Vit

[11] 3,758,620

[45] Sept. 11, 1973

[54] PROCESS FOR THE PREPARATION OF GRIGNARD REAGENTS
[75] Inventor: Jaroslav Vit, New York, N.Y.
[73] Assignee: National Patent Development Corporation, New York, N.Y.
[22] Filed: June 11, 1971
[21] Appl. No.: 152,365

Related U.S. Application Data
[63] Continuation-in-part of Ser. No. 874,711, Nov. 6, 1969, Pat. No. 3,629,288.

[52] U.S. Cl. ....... 260/665 G, 252/188, 260/448 AD
[51] Int. Cl. ........................... C07f 3/02, C07f 5/06
[58] Field of Search ................................ 260/665 G

[56] References Cited
FOREIGN PATENTS OR APPLICATIONS
1,515,582  1/1968  France

OTHER PUBLICATIONS
Corbett, Chem. Communications, 1968, pp. 1257–1258

Primary Examiner—Daniel E. Wyman
Assistant Examiner—A. P. Demers
Attorney—Alvin Guttag

[57] ABSTRACT

Homogeneous catalyst solvent systems for the preparation of Grignard reagents and the running of Grignard reactions are disclosed. These systems are superior to existing techniques for running Grignard reactions in that they significantly reduce or completely eliminate the induction periods which occur in most Grignard reagent [RMgX; where R=Alkyl or Aryl and X = Cl,Br or I] preparations and make possible the use of alkyl chlorides in the Grignard preparations instead of the more expensive alkyl bromides or iodides. The catalyst solvent systems are formed by the addition of small percentages of reducing hydrides, for example, $LiAlH_4$, $NaAlH_4$, $NaAlH_2(OCH_2CH_2OCH_3)_2$ or $NaAlH(OCH_2CH_2OCH_3)_3$, to the ether solvents, such as diethyl ether, tetrahydrofuran, dibutyl ether or 1,2 dimethoxyethane.

11 Claims, No Drawings

PROCESS FOR THE PREPARATION OF GRIGNARD REAGENTS

CROSS-REFERENCE TO RELATED APPLICATIONS

This application is a continuation-in-part of copending application Ser. no. 874,711; filed Nov. 6, 1969 now U.S. Pat. No. 3,629,288.

BACKGROUND OF THE INVENTION

1. Field of the Invention

The invention relates to the preparation of Grignard reagents and the use thereof in running Grignard reactions.

2. Prior Art

The preparation of Grignard reagents from alkyl or aryl halides and magnesium turnings in an ether solvent is well known. It is also known that the preparation of these reagents is often quite difficult. The formation of these reagents is inhibited by the presence of water and alcohols in the ethers and halides and by impurities on the surface of the magnesium turnings. The standard techniques for initiation of Grignard reactions is the addition of small amounts of $I_2$, methyl iodide (or like compounds) or the addition of preformed Grignard reagent to the solvents containing a small percentage of the total halide to be reacted. One then visually follows the color loss, in the case of $I_2$ or waits until the reaction is spontaneously running in the cases of the alkyl iodides or the preformed Grignards before further halide is added.

These techniques suffer from severe disadvantages. They must be followed visually, in commercial scale operations this is particularly difficult, and the presence of small amounts of acidically active hydrogen containing compounds destroys the catalytic activity of the additives. It is often found that reagent buildup becomes a serious problem when the reactions do not start within the expected time. Often this buildup causes an uncontrollable exothermic reaction when it finally does start. It is therefore an object of this invention to overcome the problems due to the presence of water and alcohols in the solvents and reagents, the presence of impurities on the surface of the magnesium and the difficulties incurred in controlling the induction period and the subsequent exothermic reaction.

SUMMARY OF THE INVENTION

According to the description given above in connection with the prior art, it is known that a successful Grignard reaction requires:

a. Prior purification of the ether solvent — which is always contaminated with moisture, alcohols and/or peroxides, and b. activation of the surface of the magnesium metal which is covered with a thin layer of magnesium oxide and also contains absorbed moisture.

It has now been found that both the purification of the ether and the activation of the magnesium can be effected using the same reagent. All the impurities in the ether and on the surface of the magnesium can be converted into inert materials by the addition of a small amount of one of the following complex hydrides:

$$NaAlH(OR)_3 \text{ (I) or } NaAlH_2(OR)_2 \text{ (II)}$$

wherein R is $R^1O(CH_2)_n-$, $R^1O(CH_2)_nO(CH_2)_m-$, or 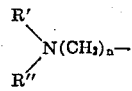

wherein $R^1$ is a lower alkyl group having 1–4 carbon atoms;

$R''$ is a lower alkyl group having 1–4 carbon atoms;

$n$ is 2,3 or 4; and $m$ is 2,3 or 4.

The above complex hydrides are members of a larger group of compounds disclosed in copending application Ser. no. 874,711 now U.S. Pat. No. 3,629,288 as being useful in the purification of aprotic solvents.

According to said application, aprotic solvents such as ethers, hydrocarbons, certain olefins and tertiary amines, are purified by being treated with a compound of the formula:

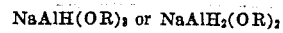

wherein R is

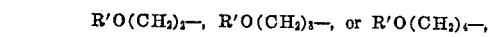

in which $R'$ is

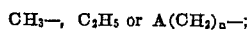

$n$ being 2, 3 or 4 and A being

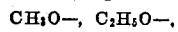

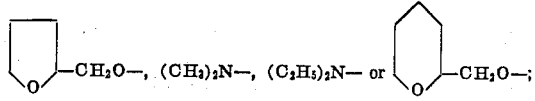

or R is

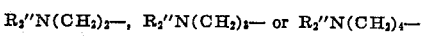

in which $R''$ is

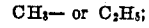

or R is

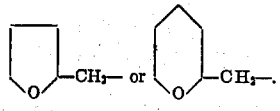

As stated in my earlier copending application, all of the above compounds are prepared according to the method disclosed in French Pat. No. 1,515,582 by similar methods with appropriately varied starting materials and the methods disclosed in' my other copending applications, now U.S. Pat. No. 3,625,622 Ser. Nos. 594,971 now abandoned; 611,845; and 626,664 now U.S. Pat. No. 3,507,895.

The complex hydrides of the formula (I) and (II) are soluble in ethers. The reaction products of said hydrides with the impurities contained in ethers are also soluble. Therefore, ethers after treatment with said hydrides remain clear. Excess amounts of the complex hydrides (I) and (II) in ethers are stable toward oxygen and therefore no inert atmosphere is required in the use, storage or handling thereof. In contact with magnesium, the above complex hydrides react quickly and quantitatively with traces of chemically bonded moisture leaving the surface of the metal clean and active for Grignard reactions. During both operations — purification of the solvent and activation of the magnesium surface — hydrogen is evolved. Cessation of hydrogen evolution indicates that a sufficient amount of complex hydride (I) or (II) has been added and that the activation is complete; both operations can be carried out at once or they can be done sequentially. Thus, there are two possible ways to utilize this invention; and both have their advantages:

a. Using a previously prepared catalyst-solvent system. This is convenient for operations using fresh ether.

b. Using a concentrated ether or aromatic hydrocarbon solution of complex hydride (I) or (II) for drying the ether and activating the magnesium. This is convenient for multiple batch operations using recovered ether.

Both hydrides (I) and (II) are soluble in aromatic hydrocarbons and ethers. Solutions of up to 80 percent concentration can be prepared. Their handling is safe and easy. The inevitable initiation period in a subsequent Grignard synthesis in systems treated with hydrides (I) or (II) is significantly shortened and is always under control.

Other ether soluble hydrides such as $LiAlH_4$ and $(i-C_4H_9)_2AlH$ can also be used but they have the following disadvantages:

a. They are self inflammable and a protective, inert atmosphere is required in the storage and handling of the catalyst-solvent systems.

b. The reaction products of said hydrides with the impurities in the ether are insoluble and the ethers after being treated therewith, remain cloudy.

DESCRIPTION OF THE PREFERRED EMBODIMENT

The catalyst solvent systems used in the invention can be prepared simply by mixing the ether soluble complex hydride with ether. The resulting solvent system must contain the hydride in an amount equivalent to from 0.005 to 0.1 gm. of active hydrogen per liter of ether. Total consumption of the hydride depends upon the total amount of impurities contained in the starting ether. Clear, oxygen stable solutions can only be obtained by using complex hydride (I) or (II). Therefore, low molecular weight complex hydride derivatives are most preferred. These are:

Sodium tris-(2-methoxyethoxy) aluminum hydride; and (III)

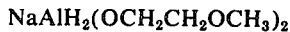

Sodium bis(2-methoxyethoxy) aluminum hydride.

(IV)

Both of these hydrides are viscous liquids, miscible with aromatic hydrocarbons. From the point of handling, the best form is a 70 percent solution thereof in benzene or toluene; traces of aromatic solvent in any ether will have no adverse influence on the Grignard reaction. Both of the complex hydrides (III) and (IV) differ in miscibility in ethers; $NaAlH(OCH_2CH_2OCH_3)_3$ is completely miscible with all ethers while $NaAlH_2(OCH_2CH_2OCH_3)_2$ forms metastable solutions tending to separate in two immiscible liquid layers. The lower layer being of high concentration and very viscous. Furthermore, $NaAlH_2(OCH_2CH_2OCH_3)_2$ forms etherates of low solubility with certain ethers (dioxane). Therefore, $NaAlH(OCH_2CH_2OCH_3)_3$ has no limitations on its use, while the use of $NaAlH_2(OCH_2CH_2OCH_3)_2$ is limited to tetrahydrofuran, glyme $(CH_3OCH_2CH_2OCH_3)$, diglyme $(CH_3OCH_2CH_2OCH_2CH_2OCH_3)$ etc.

As mentioned above, there are two possible ways of utilizing this invention, i.e., using either the catalyst-solvent system or a concentrate to initiate the Grignard reaction.

Each of these two ways will now be considered.

Initiation By Catalyst-Solvent System

Commercial anhydrous ether (diethyl ether) is charged into a vented vessel equipped with an agitator. The ventline is connected through a transparent liquid-bubble seal filled with light mineral oil. The ether soluble complex hydride, preferably in the form of a concentrated solution, is then slowly added with agitation in small portions for as long as hydrogen gas is evolved. Hydrogen evolution is easy to follow in the bubble seal. Cessation of hydrogen evolution indicates complete active hydrogen (moisture and alcohols) and peroxide removal. An additional amount of the hydride is then added in order to reach the range of 0.005 to 0.1 g of active reducing hydrogen per liter of resulting catalyst-solvent system. This solvent is then ready for use in any Grignard reaction. Magnesium turnings and catalyst-solvent are charged into a conventional reactor equipped with a liquid bubble seal filled with light mineral oil. The mixture is then brought to the boiling point and refluxed as long as hydrogen is evolved (usually no longer than 5 minutes). After hydrogen evolution has stopped, the organic halide either neat or in solution can be added. The Grignard reaction starts with a much shorter induction period than is the case when using any other conventional procedure. The induction period for organic bromides and iodides is less than one minute. The less reactive organic chlorides have longer induction periods, usually not longer than 20 minutes.

Initiation by Concentrate

Magnesium turnings and ether are charged into a conventional reactor, vented through a liquid bubble seal and the mixture is brought to reflux. A soluble complex hydride, preferably as a concentrated solution, is slowly added to the refluxing mixture in small portions until no further hydrogen is evolved. The addition of organic halide in the conventional manner can then begin. Results using both procedures are essentially the same. The time requirement using the concentrate is longer since the drying period of the solvent is longer (about 20 minutes) than the activation of the magnesium (less than 5 minutes).

EXAMPLES

Preparation of the Catalyst-Solvent

Example 1. 3 liters of diethyl ether (commercial anhydrous grade) were charged into a 5 liter round bottom flask with a dropping funnel, magnetic stirrer and bubble seal filled with light mineral oil, allowing free gas outlet and maintaining atmospheric pressure. The respective concentrated complex hydride solution was then added in the amount shown in Table 1 and the solvent was stirred until hydrogen evolution had stopped (10–20 minutes). Samples of the resulting solvent were analyzed for reducing hydrogen content by iodometric titration.

TABLE 1.—PREPARATION OF THE CATALYST-SOLVENT

| Example: | Solvent | Hydride | Content of active H in grams per liter |
|---|---|---|---|
| a | $(C_2H_5)_2O$ | $NaAlH(OCH_2CH_2OCH_3)_3$—90 cc. of a 27% benzene solution | 0.021 |
| b | do | $LiAlH_4$—5 cc. of a 30% solution in THF | 0.023 |
| c | do | $(i-C_4H_9)_2AlH$—100 cc. of a 20% toluene solution | 0.039 |
| d | Tetrahydrofuran (THF) | $NaAlH_2(OCH_2CH_2OCH_3)_2$—60 cc. of a 70% benzene solution | 0.039 |
| e | THF | $NaAlH_2(OCH_2CH_2OC_4H_9)_2$—75 cc. of a 50% toluene solution | 0.042 |
| f | $CH_3OCH_2CH_2OCH_3$ | $NaAlH_2(OCH_2CH_2CH_2OCH_3)_2$—60 cc. of a 50% glyme solution | 0.035 |
| g | $CH_3OCH_2CH_2OCH_2CH_2OCH_3$ (diglyme) | $NaAlH_2[OCH_2CH_2N(CH_3)_2]_2$—50 cc. of a 70% benzene solution | 0.033 |
| h | $(C_4H_9)_2O$ | $NaAlH(OCH_2CH_2OCH_3)_3$—130 cc. of a 70% benzene solution | 0.031 |
|  |  |  | 0.027 |

Grignard Reagent Preparation

Example 2. 5.3 grams (0.22 g-atom) of magnesium turnings and 130cc of the catalyst-solvent prepared as in example 1 were charged into a 500cc three-necked flask with mechanical stirrer, dropping funnel and reflux condenser vented through an oil filled bubble seal. The suspension was refluxed for five minutes and then 0.2 mole of organic halide diluted with an additional 70cc of the catalyst-solvent was added in portions. The first portion of the halide - about 10% of the whole volume - was added at once and the remainder dropwise after the induction period. At the end of the induction period the solution usually turns cloudy and the reaction becomes exothermic. The reaction mixture was refluxed until the reaction was completed and then analyzed by halide ion titration. The results are as shown in Table 2.

Grignard Synthesis

Example 3. The Grignard reagents RMgX was prepared as described in Example 2. Then, 0.2 mole of carbonyl compound was added in 100cc of ether and the mixture refluxed for an additional 1 hour. The reaction mixture was cooled to room temperature and hydrolyzed with 25cc of water. Product identification and yield estimations were made by GLC analysis of the clear solution. The results are given in Table 3.

TABLE 3.—GRIGNARD SYNTHESIS

| Example: | Grignard reagent | | Carbonyl comp. | Product | |
|---|---|---|---|---|---|
| a | $n-C_4H_9MgCl$ | 1a | $CH_3COC_2H_5$ | $CH_3-\underset{\underset{C_4H_9}{\mid}}{\overset{\overset{OH}{\mid}}{C}}-C_2H_5$ | 87% |
| b | $C_6H_5MgBr$ | 1a | $C_6H_5COCH_3$ | $C_6H_5-\underset{\underset{C_6H_5}{\mid}}{\overset{\overset{OH}{\mid}}{C}}-CH_3$ | 78% |
| c | $i-C_3H_7MgCl$ | 1c | $C_6H_{13}CHO$ | $C_6H_{13}-\underset{\underset{iC_3H_7}{\mid}}{\overset{\overset{}{}}{C}HOH}$ | |

Example 4. The Grignard reagent RMgX was prepared as described in Example 2. Then 0.2 mole of carboxyl compound in 100cc of ether was added. The reaction mixture was refluxed for one additional hour, hydrolyzed and analyzed as described in Example 3. The results are given in Table 4.

TABLE 4.—GRIGNARD SYNTHESIS

| Example: | Grignard reagent | | Carboxyl comp. | Product | |
|---|---|---|---|---|---|
| a | $n-C_4H_9MgCl$ | 1a | $CH_3COOC_2H_5$ | $CH_3-\underset{\underset{C_4H_9}{\mid}}{\overset{\overset{OH}{\mid}}{C}}-C_4H_9$ | 86% |
| b | $C_6H_5MgBr$ | 1f | $C_6H_5COCl$ | $(C_6H_5)_3COH$ | 74% |

TABLE 2.
GRIGNARD REAGENT SYNTHESIS

| Example | Organic Halide | Solvent (see Table 1) | Induction Period min. | Reaction Time hr. | Yield % |
|---|---|---|---|---|---|
| a | $n-C_4H_9Cl$ | 1a | 15 min | 2 hours | 90% |
| b | $n-C_4H_9Cl$ | 1e | 8 min | 2 hours | 92% |
| c | $n-C_4H_9Br$ | 1a | <1 min | 1 hour | 94% |
| d | $n-C_4H_9I$ | 1a | <1 min | ¾ hour | 91% |
| e | $CH_3CH_2CH(Cl)CH_3$ | 1a | 3 min | 1 hour | 90% |
| f | $C_6H_5Br$ | 1a | <1 min | 1 hour | 93% |
| g | $t-C_4H_9-CH_2Cl$ | 1d | 20 min | 3 hours | 87% |
| h | $C_6H_5CH_2Cl$ | 1f | 15 min | 2 hours | 85% |
| i | $n-C_4H_9Cl$ | 1h | 5 min | 1 hour | 88% |
| j | $C_2H_5Br$ | 1b | <1 min | ½ hour | 92% |
| k | $i-C_3H_7Cl$ | 1c | 2 min | 2 hours | 90% |
| l | $n-C_4H_9Br$ | 1g | <1 min | ½ hour | 89% |
| m | $2-C_5H_5NBr$ | 1c | 10 min | 5 hours | 84% |

Example 5. 5.3 grams (0.22 g-atom) of magnesium turnings and 130cc of solvent (commercial anhydrous grade) were charged into the apparatus described in Example 2. The mixture was brought to reflux and a solution of complex hydride was added drop by drop until hydrogen was no longer evolved. 0.2 mole of organic halide in 70 cc of solvent was then added and the procedure described in Example 2 was followed. Yields were estimated by halide ion titration. The results are given in Table 5.

TABLE 5.—GRIGNARD REAGENT SYNTHESIS

| | Organic halide | Solvent | Hydride | Total reaction time, hours | Yield, percent |
|---|---|---|---|---|---|
| Example: | | | | | |
| a | $nC_4H_9Cl$ | $(C_2H_5)_2O$ | $NaAlH(OCH_2CH_2OCH_3)_3$—70% solution in benzene | 3 | 87 |
| b | $C_6H_5Br$ | THF | $NaAlH_2(OCH_2CH_2OCH_3)_2$—70% solution in toluene | 1½ | 89 |
| c | $C_2H_5Br$ | $(C_2H_5)_2O$ | $LiAlH_4$—30% solution in THF | 1¼ | 90 |

What is claimed is:

1. A method for preparing Grignard reagents comprising reacting an organic halide with magnesium metal in an ether solvent in the presence of a complex hydride of the formula:

$$NaAlH(OR)_3 \text{ or } NaAlH_2(OR)_2$$

wherein

R is $R'O(CH_2)_n-$, $R'O(CH_2)_n-O-(CH_2)_m-$, or

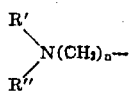

wherein R' is a lower alkyl group, R'' is a lower alkyl group, m is 2, 3 or 4, and n is 2, 3 or 4.

2. A method as claimed in claim 1 wherein the complex hydride is used in an amount corresponding to 0.005 to 0.1 gm of reducing hydrogen per liter of the ether solvent.

3. A method as claimed in claim 1 wherein the complex hydride is $NaAlH(OCH_2CH_2OCH_3)_3$ or $NaAlH_2(OCH_2CH_2OCH_3)_2$.

4. A method as claimed in claim 1 wherein the ether solvent is diethyl ether, dibutyl ether, tetrahydrofuran, glyme, diglyme or dioxane.

5. A method as claimed in claim 1 wherein the organic halide is an alkyl or aryl chloride, bromide or iodide.

6. A method as claimed in claim 1 comprising first preparing the ether solvent by adding the complex hydride to the ether, then adding the magnesium metal to the ether solvent and thereafter adding the organic halide to the ether solvent.

7. A method as claimed in claim 1 comprising first adding the magnesium metal to the ether solvent, then adding the complex hydride thereto and finally adding the organic halide to the ether solvent.

8. A method as claimed in claim 7 wherein the complex hydride is added in the form of a concentrated solution thereof in said ether or an aromatic hydrocarbon.

9. A method of activating magnesium metal for use in a Grignard reaction comprising adding magnesium metal to a composition consisting essentially of an ether solvent and a complex hydride of the formula Na Al $H(OR)_3$ or NA Al $H_2(OR)_2$ wherein R is R' O $(CH_2)_n$, or $R'O(CH_2)_n-O-(CH_2)_m-$, or

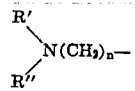

wherein R' is a lower alkyl group, R'' is a lower alkyl group, m is 2, 3 or 4, and n is 2, 3 or 4; said complex hydride being present in an amount corresponding to 0.005 to 0.1 gm of reducing hydrogen per liter of the ether solvent.

10. A method according to claim 9 wherein the complex hydride is Na Al $H(OCH_2CH_2OCH_3)_2$ or Na Al $H_2(OCH_2CH_2OCH_3)_2$.

11. A method according to claim 9 wherein the ether solvent is diethyl ether, dibutyl ether, tetrahydrofuran, glyme, diglyme or dioxane.

* * * * *